Figure 1:
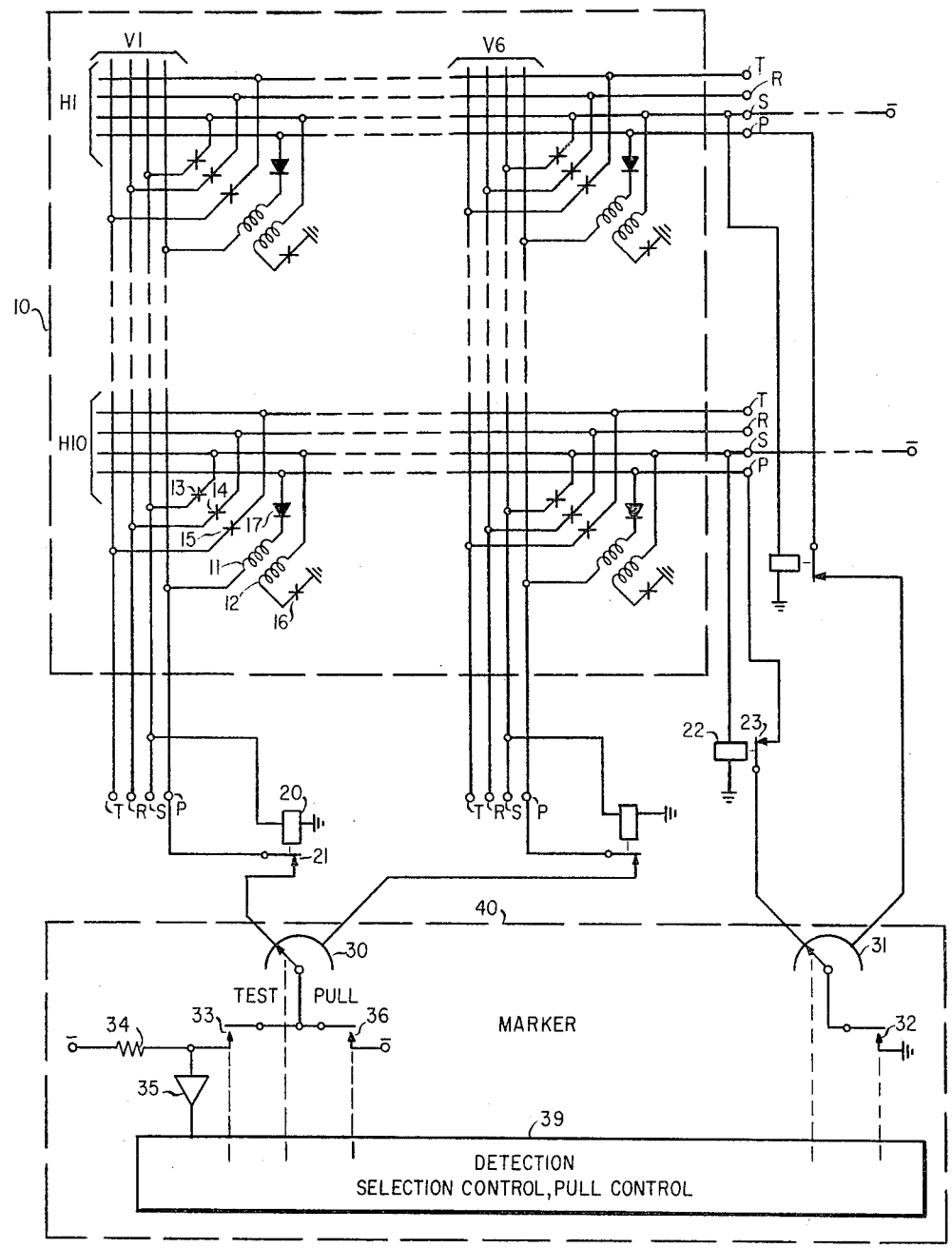
Figure 2:
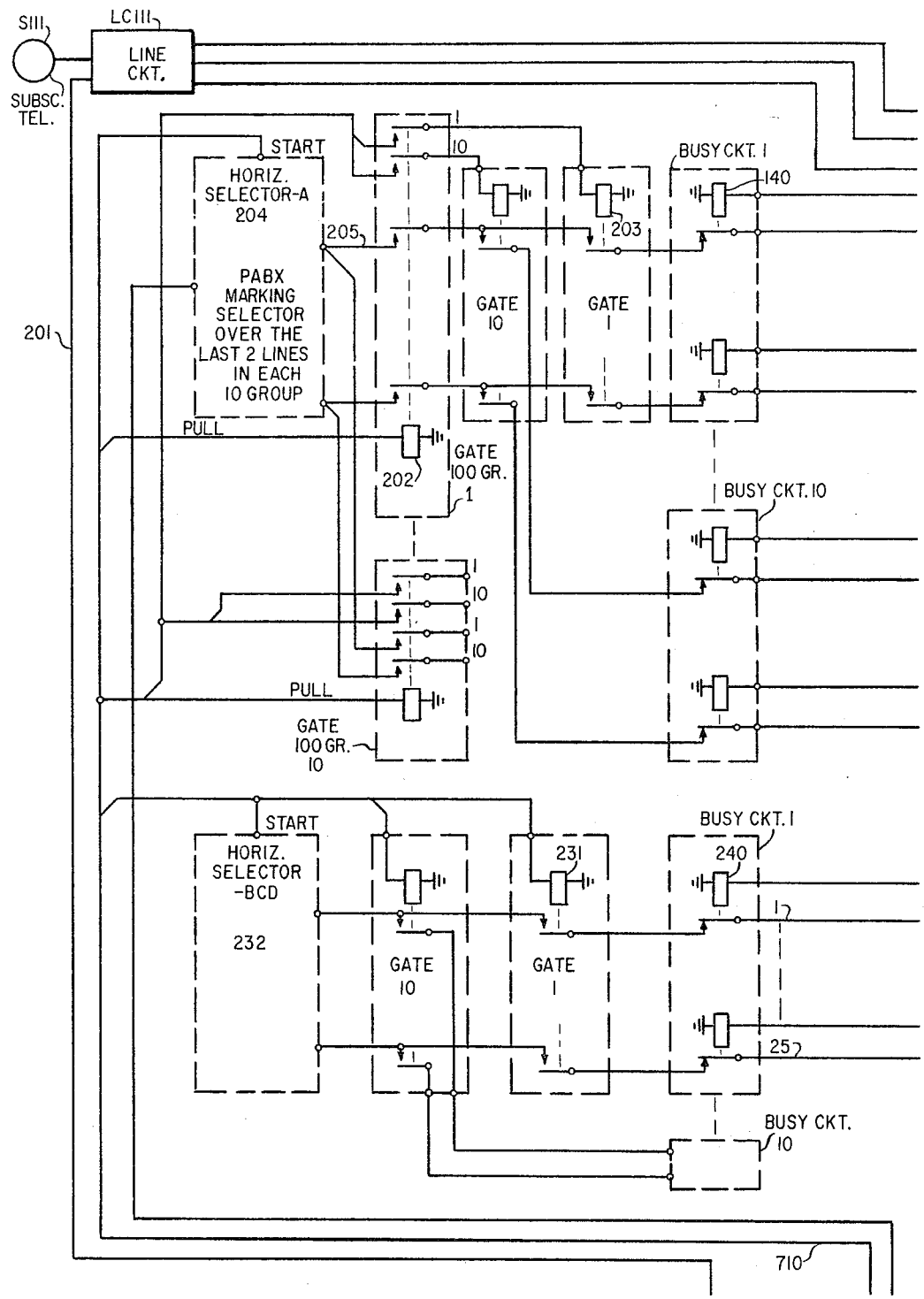
Figure 4:
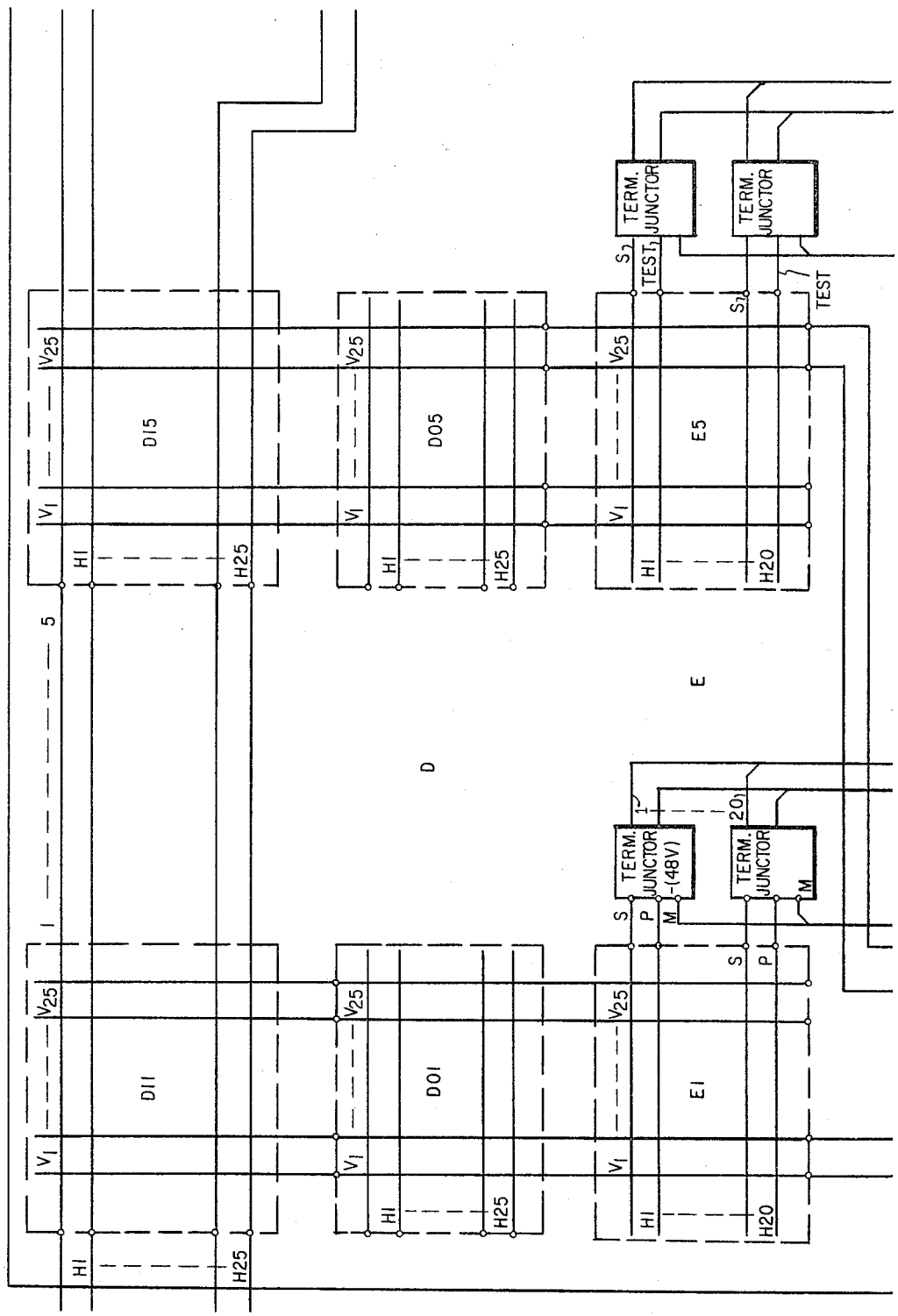

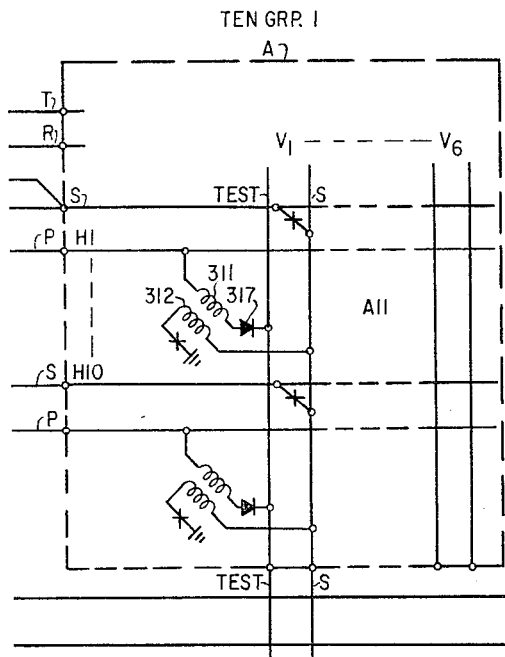
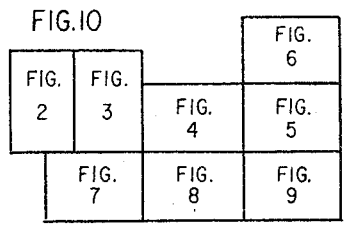
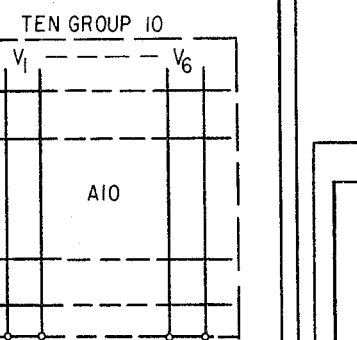
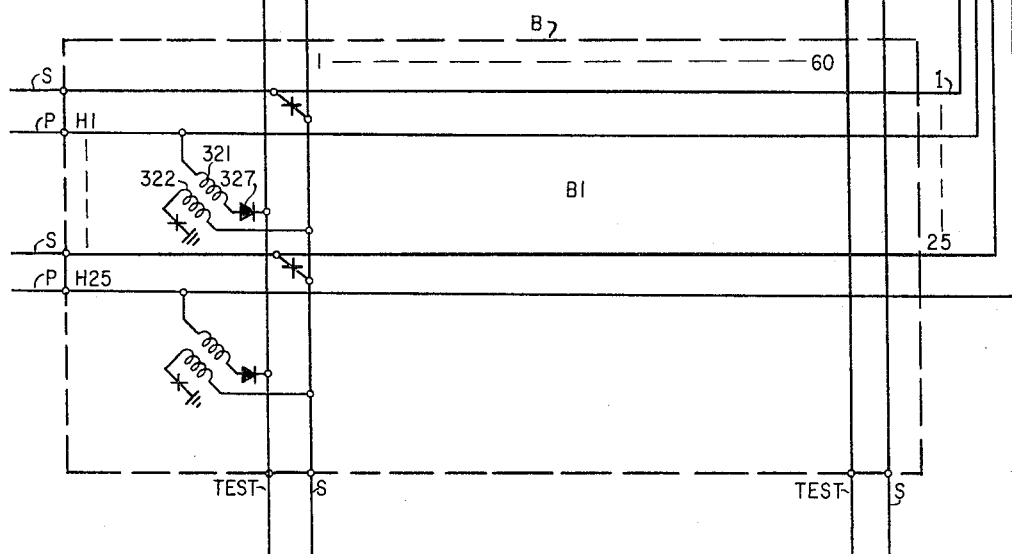
FIG.3

United States Patent Office 3,288,939
Patented Nov. 29, 1966

3,288,939
CROSSPOINT SWITCHING ARRAY AND CONTROL ARRANGEMENT THEREFOR
Kore K. Spellnes, Glen Ellyn, Ill., assignor to Automatic Electric Laboratories, Inc., Northlake, Ill., a corporation of Delaware
Filed Dec. 17, 1963, Ser. No. 331,282
3 Claims. (Cl. 179—18)

This invention relates to a crosspoint switching array and a control arrangement therefor, and more particularly to a matrix using relays as the crosspoint switching devices, and an arrangement for testing the availability of the crosspoints and establishing a connection.

There are many known crosspoint switching arrangements. The crosspoint switching devices which have been used in these arrangements include breakdown gas diodes, breakdown four-layer diodes, other semiconductor devices, and relays of various types. An advantage of relays is that all transmission paths through the network are established and maintained on full metallic switching circuits. These reliable metallic paths reduce the problem of cross talk and noise which are found in electronic systems. Particularly suitable as the crosspoint switching devices are reed relays wherein the contacts are sealed in a glass container or other suitable envelope and then the relay winding wound around all of the envelopes of the contacts comprising the relay. In one known switching arrangement a breakdown gas diode is connected in series with a reed relay winding for use in finding and establishing a connection, and the gas tube is shorted out by a set of contacts of the relay to hold the connection.

Networks using crosspoint relays with two windings in a coordinate marking arrangement are very critical, since a relay must not operate with only one winding energized, and must operate with both windings energized.

Network arrangements in which bistable breakdown devices such as gas diodes or semiconductor devices are to be broken down in series through tandem stages have the disadvantage that the breakdown devices are critical as to the voltages and currents which can be used. The breakdown voltage usually varies according to the rate at which the marking signal is applied. Also some of the devices may be required during the selecting process to carry the current of several of the other devices in parallel.

An object of this invention is to provide a reliable, non-critical crosspoint switching arrangement having a minimum of marking circuitry and other equipment.

According to the invention, a switching matrix comprises a plurality of relays arranged in a coordinate array, and each relay has two windings, for operate and hold respectively, with a diode individual to each relay connected in series with the operate winding between the operate conductors of the horizontal and vertical links, and a marker arrangement is provided to test between the operate conductors of the horizontal and vertical links via the relay operate windings. An arrangement is provided to block the test path if the crosspoint being tested is busy. This may for example comprise a busy relay individual to each link having a winding connected to the hold conductor of the link and a normally closed contact set connecting the operate conductor of the link to the marker arrangement, so that for a busy link this busy relay is operated and opens its contacts to thereby open the test path. The marker arrangement includes scanners to test rapidly over several links. The test path provides high resistance such that there is not sufficient current through the operate windings of the crosspoint relays being tested to operate them. Upon selection of a path a low resistance connection is made to the operate conductors to cause sufficient current to flow through the operate winding of the selected crosspoint relay to operate it and thereby establish a connection. A hold path at the crosspoint is completed through its hold winding and a contact set in series therewith to the hold conductor path which is completed via the link. The busy relay associated with each link also operates from the hold conductor path to open the contacts in the operate conductors of the link to thereby prevent selection of the crosspoint for another connection.

The above-mentioned and other objects and features of this invention and the manner of attaining them will become more apparent and the invention itself will be best understood, by reference to the following description of an embodiment of the invention taken in conjunction with the accompanying drawings comprising FIGS. 1–10, wherein:

FIG. 1 is a schematic diagram of a matrix, along with a diagrammatic representation of marking circuits;

FIGS. 2–9 comprise a schematic and block diagram of multi-stage switching network and marker; and FIG. 10 shows how FIGS. 2–9 are to be arranged.

A crosspoint switching matrix is shown schematically in FIG. 1, with the marking arrangement for control thereof shown symbolically. A copending U.S. patent application Serial No. 127,237 filed July 27, 1961, now Patent No. 3,188,423, for Crosspoint Switching Arrays by E. J. Glenner and myself describes this crosspoint matrix, which is formed by mounting reed relays to a printed circuit board matrix at the crosspoints thereof, with the vertical and horizontal link conductors printed on this matrix in an insulated relation to each other. The switching matrix may be incorporated in a "Communication Switching System" as described in my U.S. Patent No. 3,106,615, or in the "Communication Switching System" described in my copending U.S. patent application Serial No. 230,887, filed October 16, 1962, now Patent No. 3,170,041.

The crosspoint matrix 10 comprises six vertical links of which the first, V1, and the last, V6, are shown, and ten horizontal links of which the first, H1, and the last, H10, are shown. Each link comprises two communication conductors T and R, a control conductor S for holding a connection, and a pull conductor P for establishing a connection by operating a crosspoint relay. The conductor P is also used as a test conductor for finding an available path. At each crosspoint of a vertical link with a horizontal link a reed relay is provided. For example the reed relay at the crosspoint of vertical V1 and horizontal H10 comprises an operate or pull winding 11, a hold winding 12, and reed type contact sets 13–16. The normally open contacts sets 13, 14 and 15 when operated connect the conductors T, R and S of the vertical link to the corresponding conductors of the horizontal link. The normally open contact set 16 is connected in series with the hold winding 12 between the hold control conductor S and ground. A diode 17 is connected in series with the operate winding 11 between the pull conductors P of the vertical link V1 and horizontal link H10. The diode is poled for forward conduction when the P conductor of the vertical link is at negative potential with respect to the horizontal link. Each link includes a busy relay with the winding connected between the hold control conductor S and ground, with a normally closed contact set connected from the pull conductor P to the marking circuits. For example the vertical link V1 has a busy relay with winding 20 and contacts 21, and the horizontal H10 has a busy relay with winding 22 and contacts 23.

The pull conductors of all of the links are extended ia the busy relay contacts and connect and scanning circuits to sources of potential for test and pull potential, nder the control of detection, selection control, and ull control circuits in the marker. For example in FIG. the pull conductors of the horizontal links H1 to H10 re shown connected through the contacts of the respective busy relays via connect and scanning circuits represented symbolically by device 31 through contacts 32 to round. Likewise the pull conductors of the vertical inks V1 to V6 are connected through the contacts of the espective busy relays to connect and scan circuits represented symbolically by device 30 via test contacts 33 nd a resistor 34 to negative potential or via pull conacts 36 to a source of negative potential. These conacts and devices in the marker are controlled by circuits represented by block 39 for detection, selection conrol, and pull control. The devices 30 and 31, the conacts 32, 33 and 36, and the block 39 preferably represent combination of reed relays and semiconductor switchng and scanning circuits.

Assume now that the marker 40 is testing for an available path, and has caused contacts 32 and 33 to operate and has established connections via devices 30 and 31 to he pull conductors of vertical V1 and horizontal H10 of matrix 10. Assume further that both of these links are idle so that busy relay contacts 21 and 23 are in the normally closed position. Then a path extends from he source of negative potential via resistor 34, contacts 33, device 30, contacts 21, conductor P of link V1, operate winding 11 and diode 17 to the conductor P of H10, thence via contacts 23, device 31, and contacts 32 to ground. An amplifier 35 detects the presence of ground potential and supplies it to block 39. The impedance of resistor 34 and amplifier 35 are such that there is insufficient current flowing in operate winding 11 to operate the relay. Now assuming that this crosspoint is selected for the connection, the block 39 causes contacts 36 to operate, thereby providing a low resistance path to cause sufficient current to flow through operate winding 11 to ground at contacts 32 to operate the crosspoint.

The crosspoint contacts 13 to 16 are now closed. During the establishment of the connection the hold control conductor S of the horizontal H10 is also extended through other circuits (not shown) to a source of negative potential, so that holding current flows through the hold winding 12 and contacts 16 to ground. There is also completed a path between this source of negative potential on conductor S via busy relay winding 22 to ground to operate contacts 23 to the open position, and also from a conductor S via contacts 13 and busy relay winding 20 to operate contacts 21 to the open position. Operation of these busy relay contacts 21 and 23 prevents selection of the corresponding links for other connections. The marker 40 is then released for use in establishing other connections.

Figure 5:
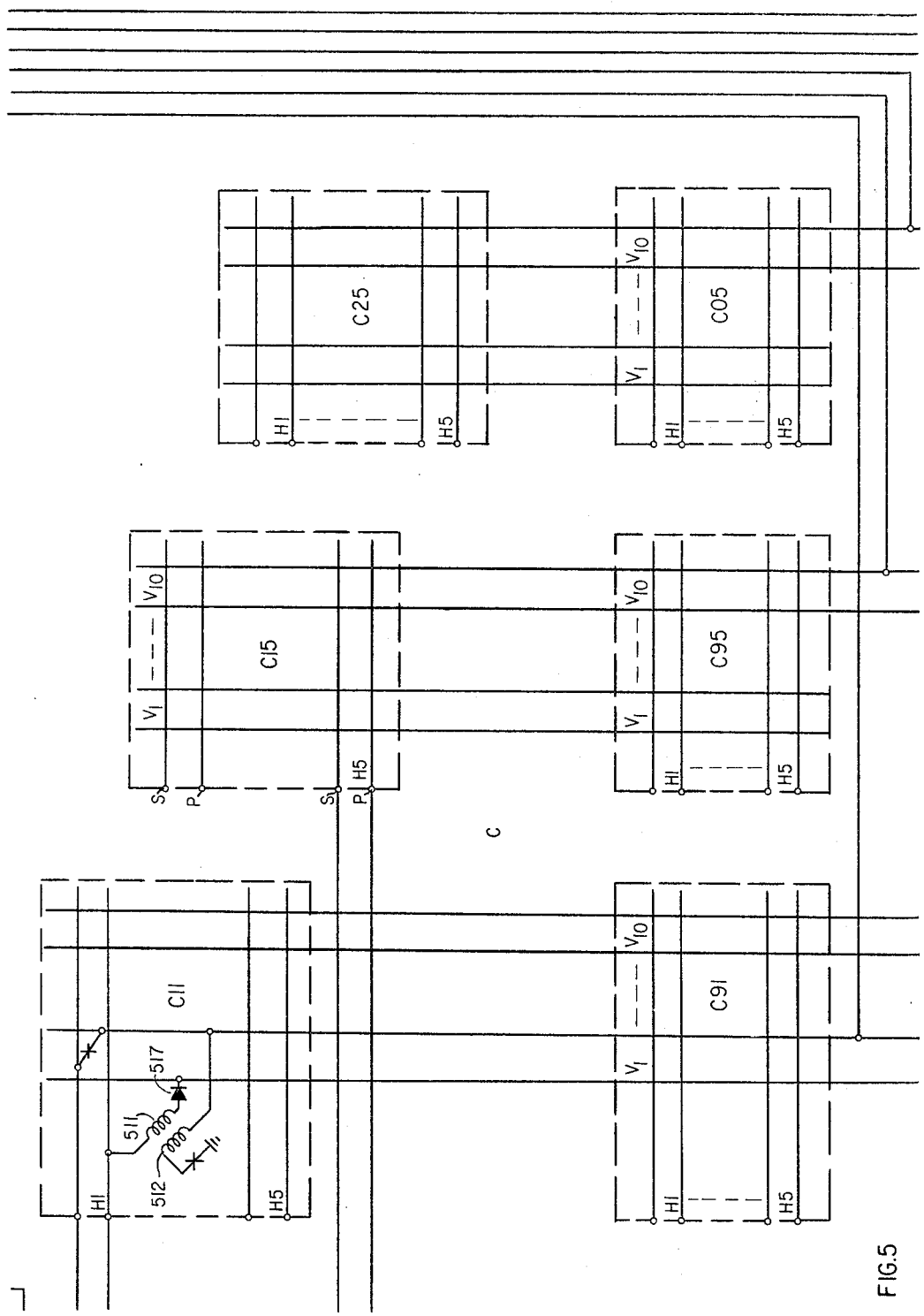
Figure 6:
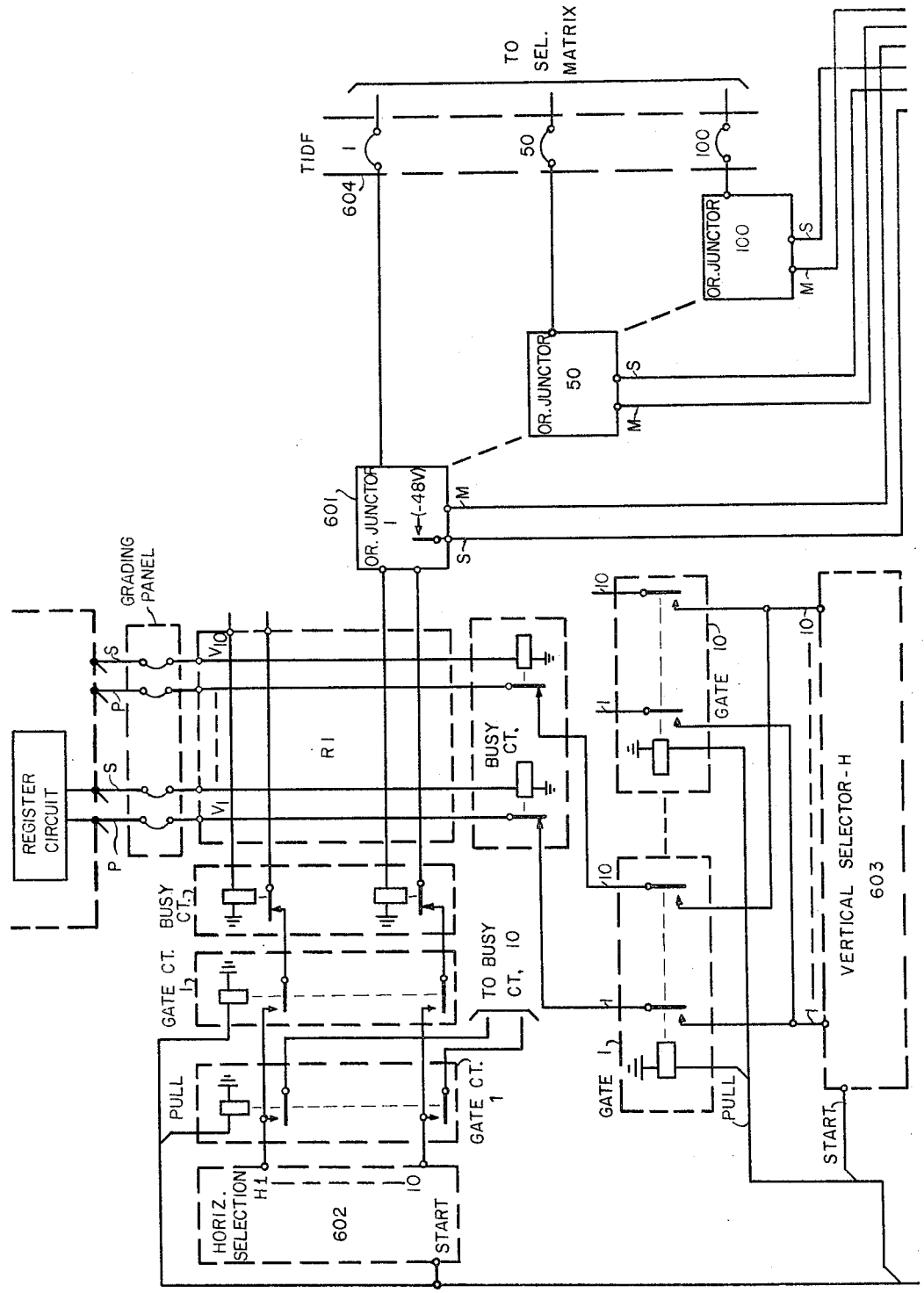

FIGS. 2–9 show one switching arrangement in which the invention may be embodied. These FIGS. 2–9 when arranged as shown in FIG. 10 comprise a schematic and block diagram of a line group comprising a switching network and marker for connecting local lines to registers and to or from group selectors. The switching network includes two stages A and B (FIG. 3) which serve both originating and terminating traffic, a stage C (FIG. 5) for originating calls, originating junctors (FIG. 6) coupling the C stage to selector inputs, an R stage (FIG. 6) connecting the originating junctors to registers, and two stages D and E (FIG. 4) for terminating traffic from terminating junctors. Connections through this switching network are controlled by a marker shown in FIGS. 2, 7, 8 and 9. Marker circuits for the R stage are also shown in FIG. 6. The switching matrices in FIGS. 3, 4, 5 and 6 are indicated by dashed line rectangles and are shown in simplified form. Each of these matrices is the same as the matrix shown in FIG. 1 except for the number of vertical and horizontal links. Only the hold conductors S and the pull conductors P are shown and only a few of the crosspoint relays are shown. The diode associated with each crosspoint relay has its cathode connected to the P lead of the vertical link and its anode coupled via the pull winding to the P lead of the horizontal link.

Each line group may serve 1000 local subscriber lines. Each A-stage matrix has a line circuit individually associated with each horizontal link, of which only one line circuit LC111 is shown. This line circuit is shown connected via a subscriber line to a subscriber station S111. The complete line group includes 100 A-stage matrices, each having ten horizontal links and six vertical links. Only two of the A-stage matrices are shown in FIG. 3, matrix A11 serving the first ten lines of the first hundreds group, and matrix A10 serving the last ten lines of the first hundreds group. There are ten B-stage matrices, each having sixty vertical links connected individually to the vertical links of the ten A-stage matrices of one hundreds group, and 25 horizontal links extending to the C and D stages. Only matrix B1 serving the first hundred lines is shown in FIG. 3.

For originating traffic there are fifty C-stage matrices each having five horizontal links and ten vertical links, six of these matrices being shown in FIG. 5. The five matrices C11–C15 have a total of 25 horizontal links which are connected individually to the 25 horizontal links of matrix D1. The five matrices C21–C25 (only C25 is being shown) are connected to the 25 horizontal links of matrix B2 (not shown). The other C-matrix horizontal links are similarly connected up to the tenth group of five switches C01–C05 which are connected to the 25 horizontal links of matrix B0 (not shown). The vertical links of the C-matrices are connected to originating junctors. The arrangement is such that the C-matrices having their horizontal links connected to B-matrices of odd hundreds groups have their vertical links connected to the originating junctors 1–50, and the C-matrices having their horizontal links connected to B-matrices of even hundreds groups have their vertical links connected to originating junctors 51–100. Thus the five C-matrices C11–C91 have their ten vertical links multipled together to the originating junctors 1–10, and the other C-matrices similarly multipled in groups of five C-matrices with vertical links to ten originating junctors. Each originating junctor has a connection through a distributing frame 604 to individual selector inlets; and each originating junctor also has a connection to a horizontal link of an R-matrix. The vertical links of the R-matrices are connected through a grading panel to register circuits. The D-stage comprises fifty matrices each having 25 horizontal links and 25 vertical links. The first five D-matrices D11–D15 have their 25 horizontal links multipled together to the horizontal links of B-matrix B1, and so on up to the tenth group of five D-matrices D01–D05 having their horizontal links multipled together to the 25 horizontal links of matrix D0 (not shown). There are 25 E-matrices each having 25 vertical links and 20 horizontal links. The 25 vertical links of an E-matrix are connected in multiple to the 25 vertical links of ten D-matrices connected to all ten of the B-matrices. Each horizontal link of each E-matrix is connected to an individual terminating junctor.

Busy circuits provide one busy relay per link, connected between the hold conductor S and ground, with a normally closed contact between the pull conductor P of the link and connect relays of the marker. The connect relays extend the P leads from the busy relay contacts to selection circuits which provide the detection, selection control, and pull control.

Figure 7:
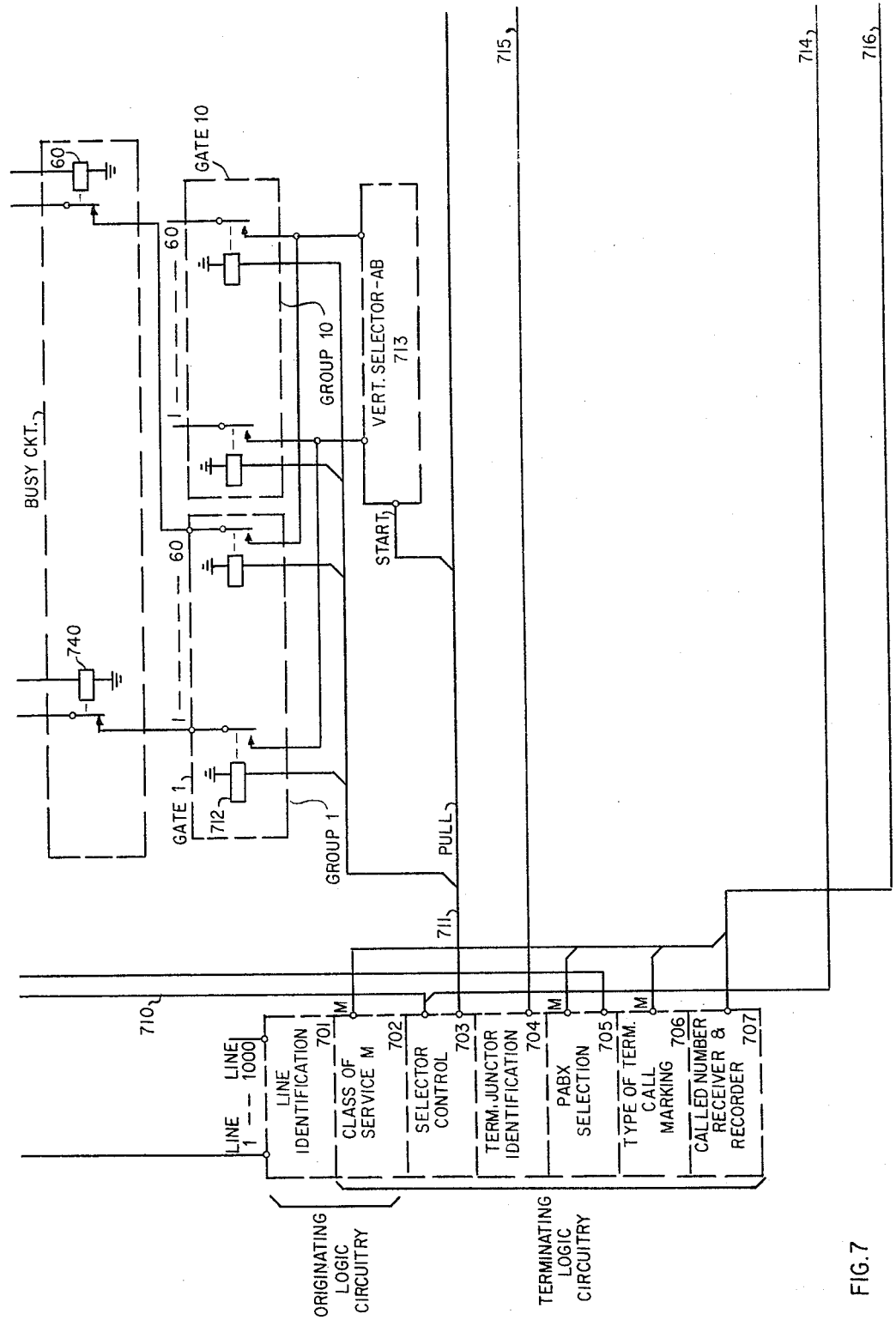
Figure 8:
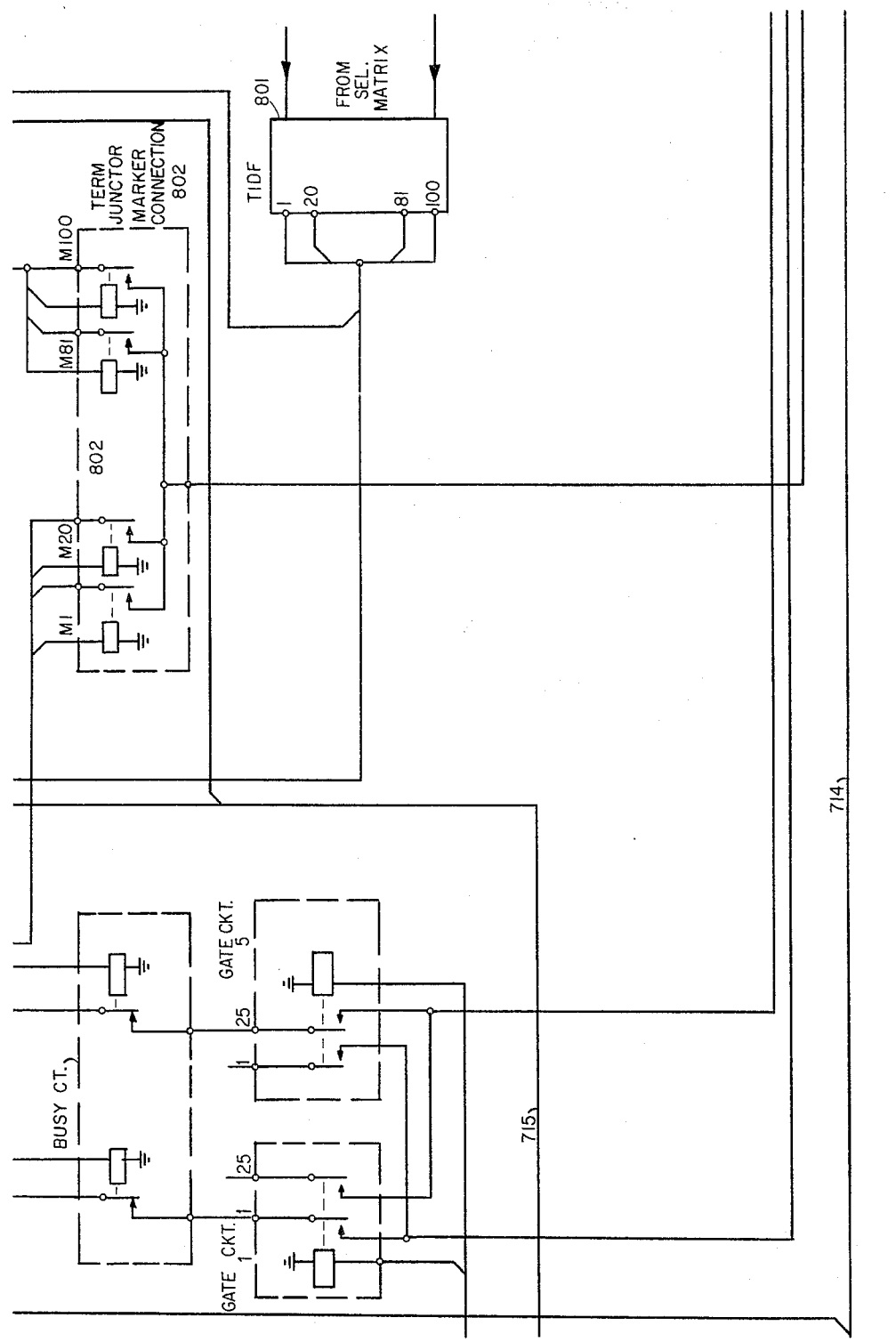
Figure 9:
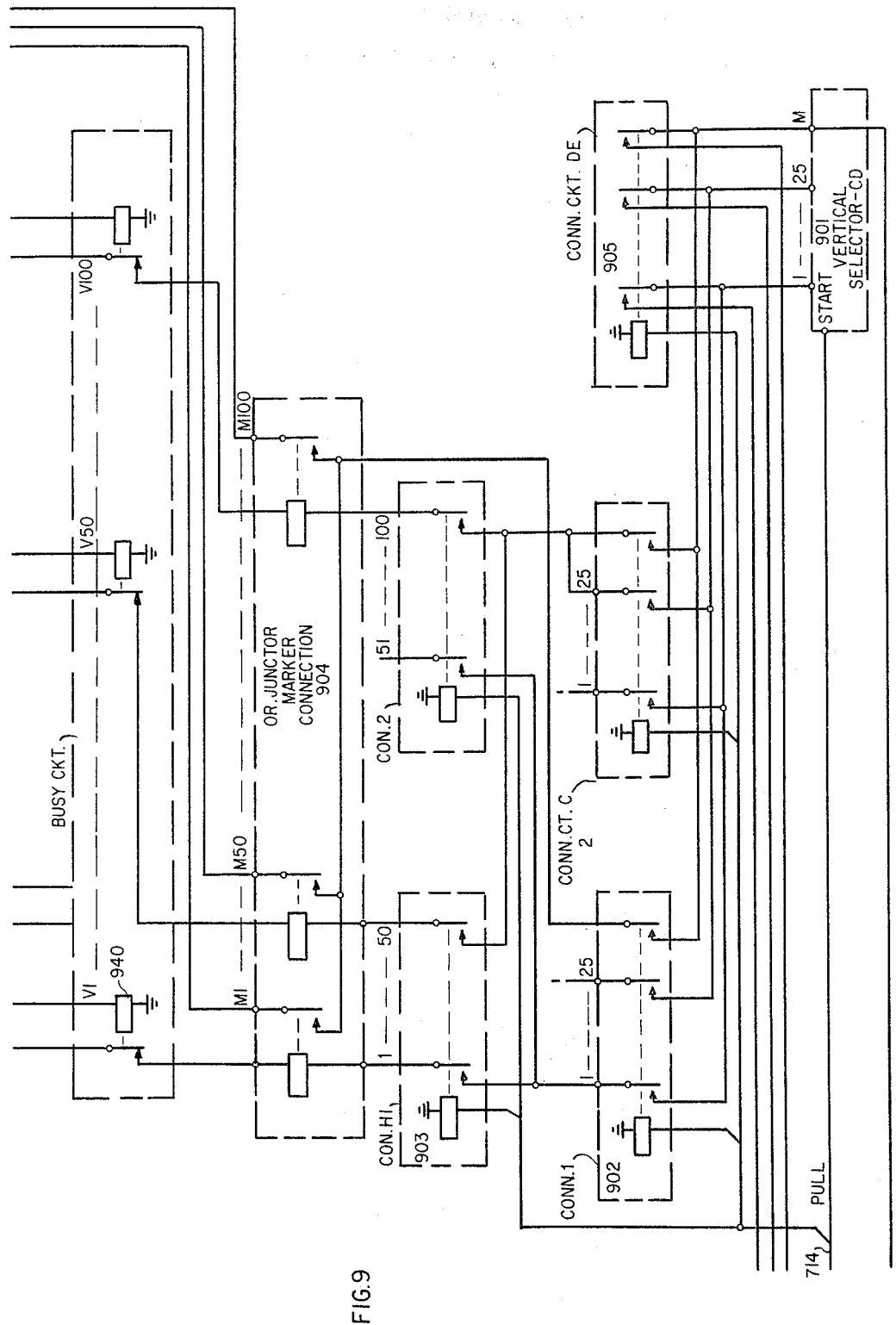

Marker control circuits shown in FIG. 7 include a line identification circuit 701, a class of service marking circuit 702, a selector control circuit 703, a terminating junctor identification circuit 704, a PABX selection circuit 705, a type of terminating call marking circuit 706, and a called number receiver and recorder 707.

Assume now that an originating call is initiated by the subscriber at station S111 by lifting his handset. The closed loop condition is detected in the line circuit LC111 and a signal is transmitted via line 201 to the line identification circuit 701. There may also be other calls from other lines initiated simultaneously. The line identification circuit identifies and selects one calling line, which we will assume to be the call from station S111. A signal potential is transmitted via selector control circuit 703 and conductor group 710 to operate connect relays 202 and 203, and to cause the horizontal selector circuit 204 to apply a ground potential via lead 205 to the pull conductor of the A-matrix horizontal link associated with line circuit LC111. Also a potential is supplied from selector control circuit 703 via conductor group 711 to operate connect relay 712 to connect the P leads of the six vertical AB links from matrix A11 to the vertical selector circuit 713. Signal potentials from the selector control circuit 703 via conductor group 710 also operate connect relay 231 to connect the C leads from matrix B1 horizontal links to the horizontal BCD link selector 232, and via conductor group 714 through operate connect relays such as relays 902 and 903 to connect the vertical C-matrix links to the vertical selector 901. The horizontal selectors 204 and 232 place ground potential on the P leads and the vertical selectors 713 and 901 place negative potential on the P leads, with high resistance detectors in at least some of the selector circuits to keep the test current flow in the pull windings of the crosspoint relays below the operate value. The selectors then scan to find an idle path between the calling line and the originating junctor. For example the horizontal selector 204 and vertical selector 713 may find an idle path from the first horizontal link of matrix A11 via crosspoint winding 311 and diode 317 to the first vertical link, the vertical selector 713 and horizontal selector 232 may find an idle path from the first vertical link of matrix B1 via diode 327 and 321 to the first horizontal link, the horizontal selector 232 and vertical selector 901 may find an idle path via crosspoint winding 511 and diode 517 between the first horizontal link and the first vertical link of matrix C11. Pull circuits are actuated to supply a low resistance path through these pull windings to cause the selected crosspoint relays to operate. A relay in the pull path in unit 904 operates to complete a marking connection to the originating junctor. Then the selected originating junctor 601 applies negative battery potential to the hold conductor S which causes holding current to flow in crosspoint hold windings 512, 322 and 312, and causes the busy relays, 740, 240, and 140 to operate and open their P lead contacts. With these P lead contacts open the links are marked busy and prevented from being seized for other connections. Also the connection is extended from originating junctor 601 to a register circuit via matrix R1 with a similar testing and pulling of a crosspoint using horizontal selector 602 and vertical selector 603.

On a terminating call, the call is extended from a selector matrix outlet via distributing frame 801 to a terminating junctor which is thereby seized. The terminating junctor transmits a call signal via conductor group 715 to the terminating junctor identification circuit 704. The terminating junctor is identified and a marking connection is established through units 802 and 905 via conductor group 714 to the called number receiver and recorder 707. Code signals designating the called number are received over the switched connection through the selector matrix to the terminating junctor and then over the connection via units 802 and 905 over conductor group 716 to the receiver 707. Path selection then occurs substantially the same as for an originating call using horizontal selectors 204 and 232 and vertical selectors 713 and 901 to select a path through the A, B, D, and E matrices between the called line and the terminating junctor.

While I have described above the principles of my invention in connection with specific apparatus, it is to be clearly understood that this description is made only by way of example and not as a limitation to the scope of my invention.

What is claimed is:
1. In a communication switching system, a first set and a second set of links, each link having a plurality of conductors including an operate conductor and a hold conductor, a switching matrix comprising a plurality of relays arranged in a coordinate array to selectively connect any link of the first set to any link of the second set under control of a marker arrangement, each relay comprising two windings, for operate and hold respectively, a unidirectional device individual to each relay connected in series with the operate winding between the operate conductors of a link of the first set and a link of the second set, with the device poled for forward conduction at the first link with respect to the second link, each relay having a normally open contact set connected in series with its hold winding to the hold conductor of one of said links;

a busy relay individual to each link having a winding connected to the hold conductor and a normally closed contact set connecting the operate conductor to the marker arrangement;

said marker arrangement including means to establish a test circuit to the operate conductors of a link of the first set and a link of the second set with a source of potential placing the link of the first set at a different polarity with respect to the link of the second set, detecting means in the test circuit operated in response to the busy relay contacts in both the first-set link and the second-set link being closed to signal the availability of the path, means in the test circuit to limit the current flow through the relay operate winding to a value less than required to operate the relay, selecting means connected to the detecting means operative responsive to the availability signals to select an available path, means to establish an operate circuit to the operate conductors of the link of the first set and the link of the second set of the selected path with a source of potential placing the link of the first set at a different polarity with respect to the link of the second set to produce a current flow through the coordinate point relay operate winding of sufficient value to operate the relay, and thereby establish the link connection;

means responsive to establishment of the link connection to complete a hold circuit via the hold conductors thereof to the hold winding of the coordinate point relay and to the busy relay windings of both links, to thereby hold the link connection and to open the busy-relay contacts, which prevents selection of either link for another connection; the operate circuit being then released.

2. In a communication switching system, the combination as claimed in claim 1, wherein there are a plurality of switching stages in tandem, each stage comprising a plurality of said matrices, and wherein said marker arrangement includes means to establish test circuits to the operate conductors of selected matrices in the successive stages and to scan and find an available path, and then to operate and to hold a connection through the successive stages.

3. In a communication switching system, a first set and a second set of links, each link having a plurality of conductors including an operate conductor and a hold conductor, a switching matrix comprising a plurality of relays arranged in a coordinate array to selectively connect any link of the first set to any link of the second set under control of a marker arrangement, each relay comprising two windings, for operate and hold respectively, a unidirectional device individual to each relay connected in series with the operate winding between the operate conductors of a link of the first set and a link of the second set, with the device poled for forward conduction at the first link with respect to the second link, each relay having a normally open contact set connected in series with its hold winding to the hold conductor of one of said links;

busy means individual to each link for detecting a given potential on its hold conductor to block signals on its operate conductor;

said marker arrangement including means to establish a test circuit to the operate conductors of a link of the first set and a link of the second set with a source of potential placing the link of the first set at a different polarity with respect to the link of the second set, detecting means in the test circuit operated in response to the busy means being normal at both the first-set link and the second-set link to signal the availability of the path, means in the test circuit to limit the current flow through the relay operate winding to a value less than required to operate the relay, selecting means connected to the detecting means operative responsive to the availability signals to select an available path, means to establish an operate circuit to the operate conductors of the link of the first set and the link of the second set of the selected path with a source of potential placing the link of the first set at a different polarity with respect to the link of the second set to produce a current flow through the coordinate point relay operate winding of sufficient value to operate the relay, and thereby establish the link connection;

means responsive to establishment of the link connection to complete a hold circuit via the hold conductors thereof to the hold winding of the coordinate point relay and placing said given potential on the hold conductors of both links, to thereby hold the link connection and to block the test path at the operate conductors of both links, which prevents selection of either link for another connection; the operate circuit being then released.

References Cited by the Examiner

UNITED STATES PATENTS 2,727,095   12/1955   Mercer     179—18
2,925,471   2/1960    Licht     179—18.7

FOREIGN PATENTS 1,075,675   2/1960    Germany.

KATHLEEN H. CLAFFY, *Primary Examiner.*

L. A. WRIGHT, *Assistant Examiner.*